(12) United States Patent
Gurovich et al.

(10) Patent No.: US 12,435,987 B2
(45) Date of Patent: Oct. 7, 2025

(54) NAVIGATION SYSTEM EMPLOYING ZONES OF INTENT

(71) Applicant: GM Global Technology Operations LLC, Detroit, MI (US)

(72) Inventors: Danilo Elia Gurovich, Marine City, MI (US); Paul E. Krajewski, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 18/421,855

(22) Filed: Jan. 24, 2024

(65) Prior Publication Data
US 2025/0237517 A1    Jul. 24, 2025

(51) Int. Cl.
G01C 21/34    (2006.01)

(52) U.S. Cl.
CPC ..... *G01C 21/3484* (2013.01); *G01C 21/3476* (2013.01)

(58) Field of Classification Search
CPC ............ G01C 21/3484; G01C 21/3476
See application file for complete search history.

(56) References Cited

U.S. PATENT DOCUMENTS

| | | | |
|---|---|---|---|
| 9,500,489 B1* | 11/2016 | Ng | G01C 21/3461 |
| 9,792,575 B2* | 10/2017 | Khasis | G01C 21/3415 |
| 9,945,686 B2 | 4/2018 | Rowley et al. | |
| 10,077,987 B2 | 9/2018 | Maurer et al. | |
| 10,107,641 B2 | 10/2018 | Zhou | |
| 10,302,446 B2 | 5/2019 | Strawn et al. | |
| 10,578,450 B2 | 3/2020 | Lebeau et al. | |
| 10,579,939 B2 | 3/2020 | Mcgavran et al. | |
| 10,663,313 B2 | 5/2020 | Sharifi et al. | |
| 10,664,899 B2 | 5/2020 | Ogden et al. | |
| 10,697,791 B2* | 6/2020 | Quint | G01C 21/3644 |
| 10,949,831 B1* | 3/2021 | Gaudin | G06Q 20/367 |
| 11,181,388 B2 | 11/2021 | Moore et al. | |
| 11,506,497 B2 | 11/2022 | Moore et al. | |
| 11,573,097 B2 | 2/2023 | Khoe et al. | |
| 11,720,101 B1 | 8/2023 | Dolgov et al. | |
| 11,808,584 B1 | 11/2023 | Meyer et al. | |
| 12,085,400 B2* | 9/2024 | Ozturk | G07C 5/02 |
| 2005/0102102 A1* | 5/2005 | Linn | G01C 21/3682 701/411 |

(Continued)

FOREIGN PATENT DOCUMENTS

DE    102010003191 A1    11/2010
DE    102014016837 A1    5/2016

*Primary Examiner* — Tyler J Lee
(74) *Attorney, Agent, or Firm* — Vivacqua Crane, PLLC

(57) ABSTRACT

Systems, methods, and devices for efficient fulfilment of user needs that dynamically arise during a trip are described. Fulfilling the user needs includes identifying the need, negotiating a plurality of attributes related to satisfying the need, determining at least one geotemporal zone of intent for satisfying the need based on a vector of intended travel of the vehicle and the negotiated plurality of attributes, detecting a point of interest for fulfilling the need within one or more of the at least one geotemporal zone of intent, and returning the point of interest to the user for addition to the trip as a waypoint to fulfill the need based on optimizing user satisfaction with the trip over other points of interest for fulfilling the need.

20 Claims, 14 Drawing Sheets

(56) References Cited

U.S. PATENT DOCUMENTS

| | | | |
|---|---|---|---|
| 2007/0010942 A1* | 1/2007 | Bill | G01C 21/3617 |
| | | | 701/424 |
| 2007/0219706 A1 | 9/2007 | Sheynblat | |
| 2013/0197796 A1 | 8/2013 | Obradovich et al. | |
| 2014/0274107 A1 | 9/2014 | Rados | |
| 2016/0069697 A1* | 3/2016 | Oel | G01C 21/3605 |
| | | | 701/426 |
| 2017/0154394 A1* | 6/2017 | Kan | G06Q 10/1097 |
| 2017/0242433 A1* | 8/2017 | Ochiai | G01C 21/3484 |
| 2017/0314949 A1* | 11/2017 | Rovik | G01C 21/3476 |
| 2018/0112995 A1 | 4/2018 | Bortolussi et al. | |
| 2019/0120654 A1* | 4/2019 | Todasco | G01C 21/3476 |
| 2019/0162548 A1* | 5/2019 | Fujita | B60W 20/12 |
| 2021/0003409 A1* | 1/2021 | Uematsu | G06F 17/18 |
| 2021/0372806 A1* | 12/2021 | Ozturk | G01C 21/3682 |
| 2023/0406131 A1* | 12/2023 | Quint | B60L 53/62 |
| 2024/0110806 A1* | 4/2024 | Bahnsen | G01C 21/3602 |

* cited by examiner

NAVIGATION SYSTEM EMPLOYING ZONES OF INTENT

INTRODUCTION

The disclosure relates to the field of navigation and, more specifically, to systems and methods for fulfilling dynamically arising user needs using one or more zones of intent.

Existing navigation systems allow users to navigate to a destination, including the ability to set one or more waypoints along the route. During a trip, vehicle occupants may have one or more needs arise. Users may have difficulty in predicting, identifying, and/or fulfilling such needs. Therefore, there is a need in the art to coordinate efficient fulfilment of dynamically arising user needs.

SUMMARY

Systems, methods, and devices in accordance with the present disclosure provide for alignment of need fulfilment with vehicle movement and user preferences to optimize user satisfaction for a trip.

Beneficially, the navigation system enables alignment of the intended path of the vehicle with explicit or implicit user preferences to create timely options for the user to fulfill needs that arise during the trip at locations along the intended path of the vehicle to optimize wayfinding that satisfies those needs using one or more zones of intent. This provides optimized vehicle operation, reduced energy consumption, reduced time to complete a set of tasks that fulfill the needs, and/or increased user satisfaction for the trip.

Each zone of intent may represent a quantization of user intent in decision making, such as the desire to deviate from the trip given at least one condition. For example, a first zone of intent may be conditioned on a travel time of the vehicle, a second zone of intent may be conditioned on geographic distance from the vehicle, a third zone of intent may be conditioned on elapsed travel time, a fourth zone of intent may be conditioned on the user's desire for food, and a fifth zone of intent may be conditioned on lag time between arrival of the vehicle and fulfillment of the need. In some aspects, these zones of intent may be used to identify points of interest along the user's path to fulfill the user's need of food while minimizing or eliminating a wait time between the user arriving at the location and obtaining the food (e.g., pre-ordering food such that the order is ready contemporaneously with the user's arrival).

According to aspects of the present disclosure, a system includes a need identifier, a search attribute negotiator, a point of interest identifier, and a navigational display. The need identifier is configured to identify of a user of a vehicle arising during a trip. The search attribute negotiator is configured to negotiate a plurality of attributes related to satisfying the need based on a state of the trip. The point of interest identifier is configured to determine at least one geotemporal zone of intent for satisfying the need based on a vector of intended travel of the vehicle and the negotiated plurality of attributes, detect a point of interest for fulfilling the need within one or more of the at least one geotemporal zone of intent, and return the point of interest to the user for addition to the trip as a waypoint to fulfill the need based on optimizing user satisfaction with the trip over other points of interest for fulfilling the need. The navigational display is configured to direct the user along a navigational route to the waypoint.

According to further aspects of the present disclosure, the need identifier is configured to passively identify the need by obtaining the state of the trip, determining a probability of occurrence of the need of the user based on the obtained state of the trip, and prompting the user, in response to the probability exceeding a predetermined threshold, to confirm at least one detail of the need.

According to further aspects of the present disclosure, the plurality of attributes includes an urgency for satisfying the need based on a type of the need.

According to further aspects of the present disclosure, the urgency for satisfying the need is further based on an unprompted user input.

According to further aspects of the present disclosure, the need is a first need, the point of interest is a first point of interest, and the point of interest identifier is further configured to identify a second need arising during the trip, negotiate a second plurality of attributes related to satisfying the first need and the second need, determine at least one second geotemporal zone of intent for satisfying the first need and the second need based on the vector of intended travel of the vehicle and the negotiated second plurality of attributes, detect a second point of interest for fulfilling the second need within one or more of the at least one second geotemporal zone of intent, and return the second point of interest to the user for addition to the trip as a second waypoint to fulfill the second need based on optimizing user satisfaction with the trip.

According to further aspects of the present disclosure, the waypoint is a first waypoint, the second need is identified during navigation to the first waypoint, and the point of interest identifier is further configured to detect a third point of interest for fulfilling the first need within the one or more of the at least one second geotemporal zone of intent, determine, based on fulfilling the second need at the second point of interest, that the third point of interest provides greater user satisfaction based on the second plurality of attributes than the first point of interest provides, and return the third point of interest to the user as a third waypoint to replace the first waypoint.

According to further aspects of the present disclosure, the other points of interest for fulfilling the first need includes the third point of interest.

According to further aspects of the present disclosure, the second need is a need of a second user.

According to aspects of the present disclosure, a method includes identifying a need of a user of a vehicle arising during a trip, negotiating a plurality of attributes related to satisfying the need, determining at least one geotemporal zone of intent for satisfying the need based on a vector of intended travel of the vehicle and the negotiated plurality of attributes, detecting a point of interest for fulfilling the need within one or more of the at least one geotemporal zone of intent, and returning the point of interest to the user for addition to the trip as a waypoint to fulfill the need based on optimizing user satisfaction with the trip over other points of interest for fulfilling the need.

According to further aspects of the present disclosure, the need is passively identified, via a need identifier, by obtaining a state of the trip, determining a probability of occurrence of the need of the user based on the obtained state of the trip, and prompting the user, in response to the probability exceeding a predetermined threshold, to confirm at least one detail of the need.

According to further aspects of the present disclosure, the plurality of attributes includes an urgency for satisfying the need based on a type of the need.

According to further aspects of the present disclosure, the urgency for satisfying the need is further based on an unprompted user input.

According to further aspects of the present disclosure, the need is a first need, the point of interest is a first point of interest, and the method further includes identifying a second need arising during the trip, negotiating a second plurality of attributes related to satisfying the first need and the second need, determining at least one second geotemporal zone of intent for satisfying the first need and the second need based on the vector of intended travel of the vehicle and the negotiated second plurality of attributes, detecting a second point of interest for fulfilling the second need within one or more of the at least one second geotemporal zone of intent, and returning the second point of interest to the user for addition to the trip as a second waypoint to fulfill the second need based on optimizing user satisfaction with the trip.

According to further aspects of the present disclosure, the waypoint is a first waypoint, identifying the second need occurs during navigation to the first waypoint, and the method further includes detecting a third point of interest for fulfilling the first need within the one or more of the at least one second geotemporal zone of intent, determining, based on fulfilling the second need at the second point of interest, that the third point of interest provides greater user satisfaction based on the second plurality of attributes than the first point of interest provides, and returning the third point of interest to the user as a third waypoint to replace the first waypoint.

According to further aspects of the present disclosure, the other points of interest for fulfilling the first need includes the third point of interest.

According to further aspects of the present disclosure, the second need is a need of a second user.

According to aspects of the present disclosure, a vehicle includes a need identifier, a search attribute negotiator, a point of interest identifier, and a navigational display. The need identifier configured to identify of a user of the vehicle arising during a trip. The search attribute negotiator configured to negotiate a plurality of attributes related to satisfying the need based on a state of the trip. The point of interest identifier configured to determine at least one geotemporal zone of intent for satisfying the need based on a vector of intended travel of the vehicle and the negotiated plurality of attributes, detect a point of interest for fulfilling the need within one or more of the at least one geotemporal zone of intent, and return the point of interest to the user for addition to the trip as a waypoint to fulfill the need based on optimizing user satisfaction with the trip over other points of interest for fulfilling the need. The navigational display configured to direct the user along a navigational route to the waypoint.

According to further aspects of the present disclosure, the need is a first need, the point of interest is a first point of interest, and the point of interest identifier is further configured to identify a second need arising during the trip, negotiate a second plurality of attributes related to satisfying the first need and the second need, determine at least one second geotemporal zone of intent for satisfying the first need and the second need based on the vector of intended travel of the vehicle and the negotiated second plurality of attributes, detect a second point of interest for fulfilling the second need within one or more of the at least one second geotemporal zone of intent, and return the second point of interest to the user for addition to the trip as a second waypoint to fulfill the second need based on optimizing user satisfaction with the trip.

According to further aspects of the present disclosure, the waypoint is a first waypoint, the second need is identified during navigation to the first waypoint, and the point of interest identifier is further configured to detect a third point of interest for fulfilling the first need within the one or more of the at least one second geotemporal zone of intent, determine, based on fulfilling the second need at the second point of interest, that the third point of interest provides greater user satisfaction based on the second plurality of attributes than the first point of interest provides, and return the third point of interest to the user as a third waypoint to replace the first waypoint.

According to further aspects of the present disclosure, the other points of interest for fulfilling the first need includes the third point of interest.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

in particular, FIG. 2A illustrates a first zone of intent for a vehicle traveling at a higher speed with a moderate density relative to FIGS. 2B and C;

in particular, FIG. 2B illustrates a second zone of intent for a vehicle traveling at a moderate speed with a low density relative to FIGS. 2A and C;

in particular, FIG. 2C illustrates a third zone of intent for a vehicle traveling at a lower speed with a high density relative to FIGS. 2A and B;

in particular, FIG. 2D illustrates a fourth zone of intent for a vehicle with an emergency condition;

in particular, FIG. 3A is a depiction of the vehicle traveling along a roadway on the map;

in particular, FIG. 3B is a depiction of a first zone of intent overlayed on the map;

in particular, FIG. 3C is a depiction of a second zone of intent overlayed on the map;

in particular, FIG. 3D is a depiction of the vehicle traveling along the roadway with the first zone of intent and the second zone of intent overlayed on the map;

DETAILED DESCRIPTION

The following detailed description is merely exemplary in nature and is not intended to limit the application and uses. Furthermore, there is no intention to be bound by expressed or implied theory presented in the preceding introduction, summary, or brief description of the drawings or the following detailed description.

Figure 1:
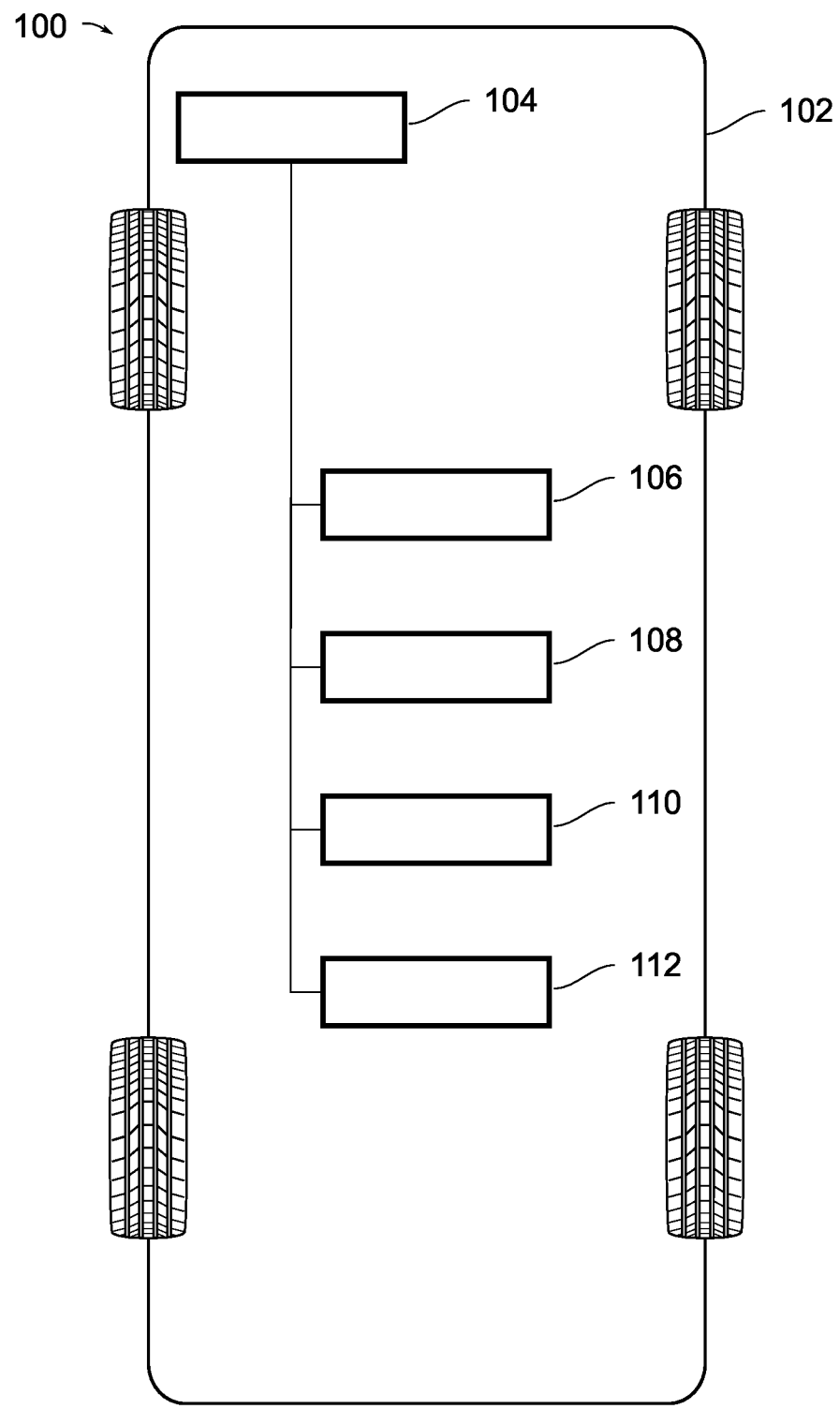
FIG. 1 illustrates a system for vehicle navigation, according to aspect of the present disclosure.

FIG. 1 illustrates a system 100 for vehicle navigation. The system is configured to align fulfillment of a user need with vehicle movement and user preferences to optimize user satisfaction for a trip.

The system 100 includes a vehicle 102 having at least one controller 104, a need identifier 106, a search attribute negotiator 108, a point of interest identifier 110, and a navigation display 112. The navigation display 112 is configured to display navigation to selected points of interest to the user during the trip.

To appropriately control operation of coupled components, the controller 104 may include a processor (e.g., a microprocessor) and at least one memory, at least some of which is tangible and non-transitory. The memory can store controller-executable instruction sets, and the processor can execute the controller executable instruction sets stored in the memory. The memory may be recordable medium that participates in providing computer-readable data or process instructions.

The recordable medium may take many forms, including but not limited to non-volatile media and volatile media. Non-volatile media for the controller 104 may include, for example, optical or magnetic disks and other persistent memory. Volatile media may include, for example, dynamic random access memory (DRAM), which may constitute a main memory. The memory of the controller 104 may also include a solid-state medium, a floppy disk, a flexible disk, hard disk, magnetic tape, another magnetic medium, a CD-ROM, DVD, another optical medium, combinations thereof, and the like.

The controller-executable instruction sets may be transmitted by one or more transmission media, including coaxial cables, copper wire or traces, fiber optics, combinations thereof, and the like. For example, the transmission media may include a system bus that couples two or more components of the system 100, such as the need identifier 106, the search attribute negotiator 108, the point of interest identifier 110, the navigation display 112, and the controller 104.

The controller 104 can be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Any algorithms required by the controller 104 or accessible thereby may be stored in the memory and automatically executed to provide the required functionality for the relevant components, such as the need identifier 106, the search attribute negotiator 108, and the point of interest identifier 110. Further, components such as the need identifier 106, the search attribute negotiator 108, and the point of interest identifier 110 may be implemented on one or more controllers 104.

The need identifier 106 is configured to identify at least one need of a user of a vehicle on a trip. As will be discussed in detail further below, the need identifier 106 may actively or passively identify the need. Further, the need identifier 106 may be further configured to identify the user associated with the need. For example, the need identifier may use one or more of identification data, role data, historical response data, biometric data, credential information, associated devices, associated individuals, relationships, use history, and behavioral information to determine an identity of the user.

The search attribute negotiator 108 is configured to receive and negotiate a plurality of attributes related to satisfying the need. The attributes may include contemporaneous inputs (e.g., voice input or text input) from the user, stored preferences for the user and/or demographics, weather conditions (e.g., known or forecasted conditions), number and/or identity for vehicle occupants, time of day, elapsed and/or remaining trip time, vehicle speed, roadway type, roadway conditions, categorical and/or expressed urgency of the need, and raw search area. The search attribute negotiator 108 may negotiate the attributes by filtering and prioritizing received data based on stored preferences, raw search area, available inputs, and available constraints for the need.

The point of interest identifier 110 is configured to determine at least one zone of intent for satisfying the need, detect points of interest within one or more of the determined zones of intent, and return at least one point of interest to the user for addition to the trip as a waypoint to fulfill the need based on optimizing user satisfaction with the trip. Each zone of intent may represent a quantization of user intent in decision making, such as the desire to deviate from the present navigation given at least one condition. For example, a first zone of intent may be conditioned on a travel time of the vehicle, a second zone of intent may be conditioned on geographic distance from the vehicle, a third zone of intent may be conditioned on elapsed travel time, a fourth zone of intent may be conditioned on the user's desire for food, and a fifth zone of intent may be conditioned on lag time between arrival of the vehicle and fulfillment of the need.

FIGS. 2A-D illustrate example zones of intent 202 for fulfilling a need based on vehicle speed and density of fulfillment locations. The zone of intent 202a-d is a shape defining a perimeter 204a-d and may include an offset 206a-c from the vehicle 102. The perimeter 204a-d defines a geotemporal boundary for returning points of interest that may fulfill the need. The offset 206a-c spaces the respective zone of intent 202a-d a distance from the vehicle. The offset 206a-c is selected such that the proximate edge of the zone of intent is sufficiently ahead of the vehicle 102 such that the user has sufficient time to decide whether to add a point of interest from within the zone of intent without backtracking.

Figure 2A:
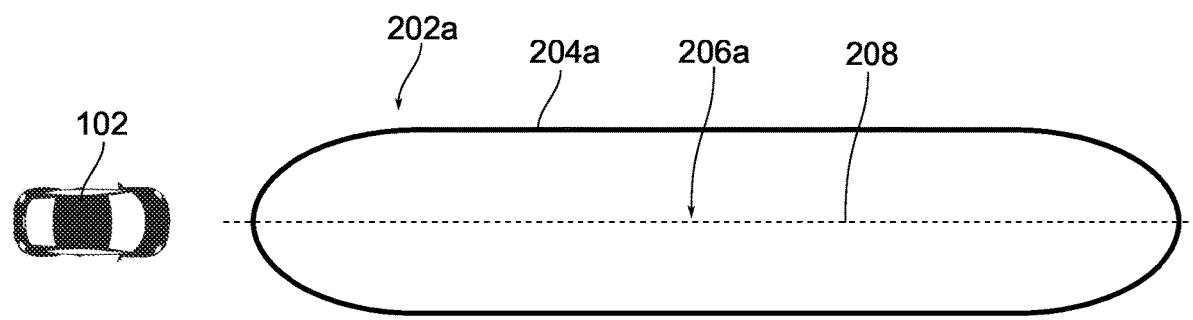
FIGS. 2A-D illustrate example zones of intent for fulfilling a need for combinations of vehicle speed and density of fulfillment locations, according to aspect of the present disclosure.
Figure 2B:
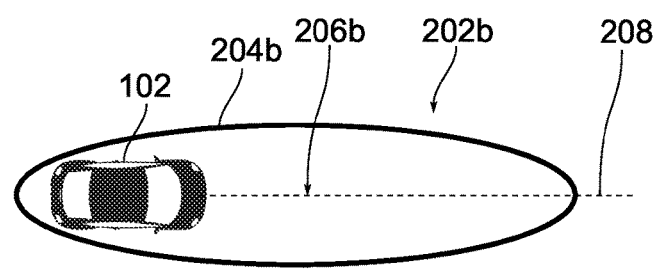

FIG. 2A illustrates a first zone of intent 202a for a vehicle 102 traveling at a higher speed with a moderate density relative to FIGS. 2B and C. The first zone of intent 202a defines a shape having a generally oblong perimeter 204a that extends along the vector of intended travel 208 such that the vector of intended travel 208 aligns with a centerline of the oblong shape. The first zone of intent 202a includes a first offset 206a that is a first predetermined distance ahead of the vehicle 102.

FIG. 2B illustrates a second zone of intent 202b for a vehicle 102 traveling at a moderate speed with a low density relative to FIGS. 2A and C. The second zone of intent 202b defines a shape having a generally elongate perimeter 204b that extends along the vector of intended travel 208. The second zone of intent 202b includes a second offset 206b that is a second predetermined distance ahead of the vehicle 102. The second predetermined distance for the second offset 206b is less than the first offset 206a. In the illustrated example, the vehicle 102 is within the second zone of intent 202b and proximate to the trailing edge of the second zone of intent 202b.

Figure 2C:
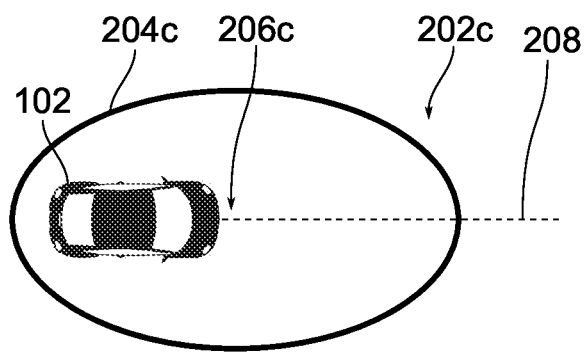

FIG. 2C illustrates a third zone of intent 202c for a vehicle 102 traveling at a lower speed with a high density relative to FIGS. 2A and B. The third zone of intent 202c defines a shape having a generally elliptical perimeter 204c that extends along the vector of intended travel 208. The third zone of intent 202c includes a third offset 206c that is a third predetermined distance ahead of the vehicle 102. The third predetermined distance is less than both the second predetermined distance and the first predetermined distance. In the illustrated example, the vehicle 102 is within the third zone of intent 202c, spaced a distance away from the trailing edge of the third zone of intent 202c, and proximate to the third offset 206c.

Figure 2D:
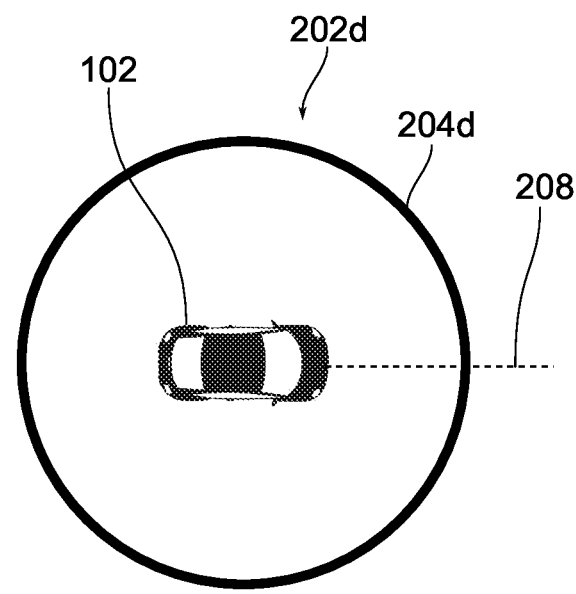

FIG. 2D illustrates a fourth zone of intent 202d for a vehicle 102 with an emergency condition. The fourth zone of intent 202d defines a shape having a circular perimeter 204d centered on the vehicle 102. In some aspects, while in the emergency condition, points of interest that within the fourth zone of intent 202d that fulfill the emergency need are ranked and returned based on estimated travel time.

FIGS. 3A-D illustrate a representation of a search 300 with multiple filtered layers depicted on a map 302.

Figure 3A:
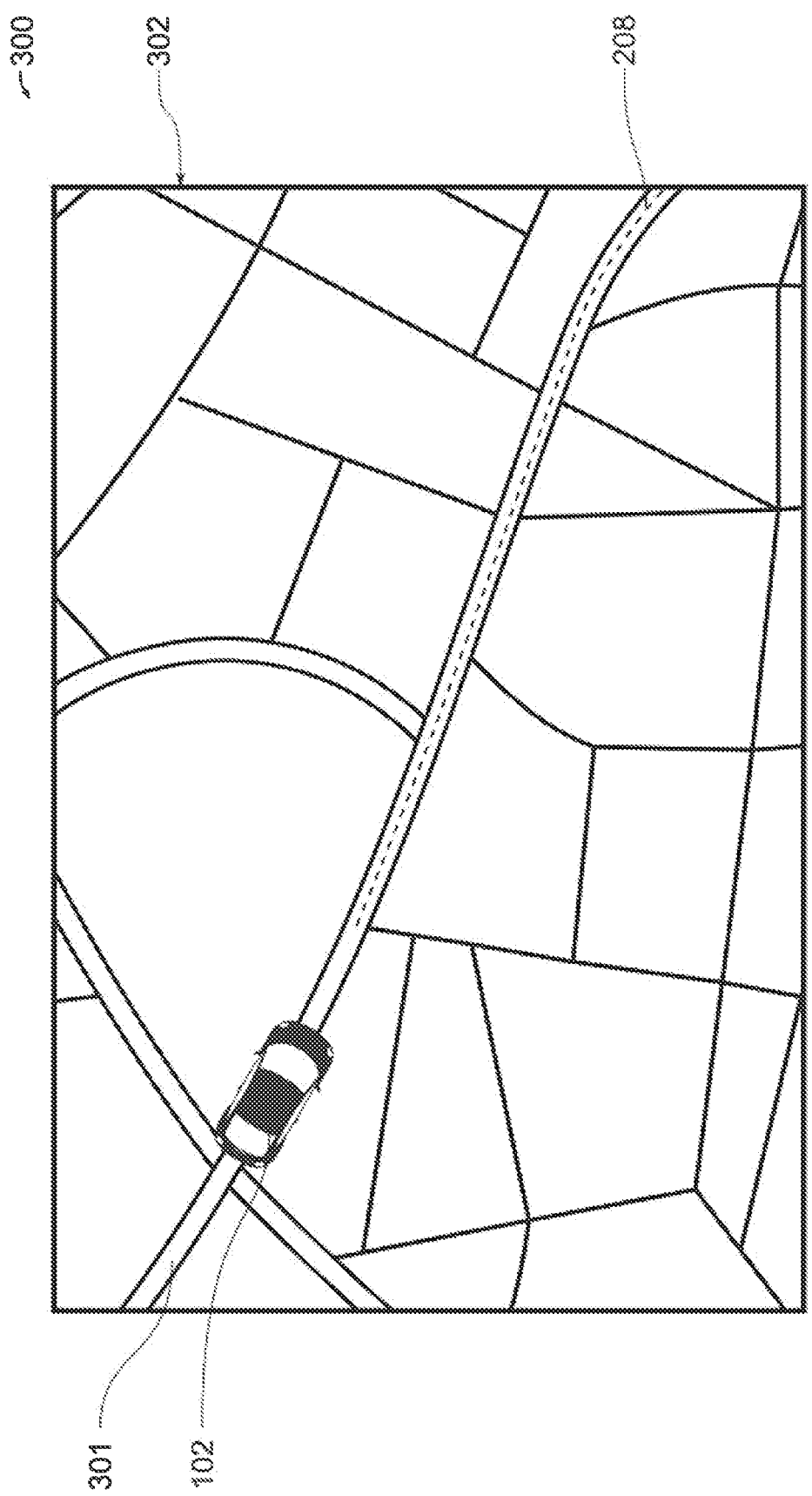
FIGS. 3A-D illustrate a representation of a search with multiple filtered layers depicted on a map, according to aspect of the present disclosure.

FIG. 3A is a depiction of the vehicle 102 traveling along a roadway 301 on the map 302. The map 302 includes a vector of intended travel 208 for the vehicle 102 that extends in the direction of travel and follows the expected travel path of the vehicle 102 along roadway.

Figure 3B:
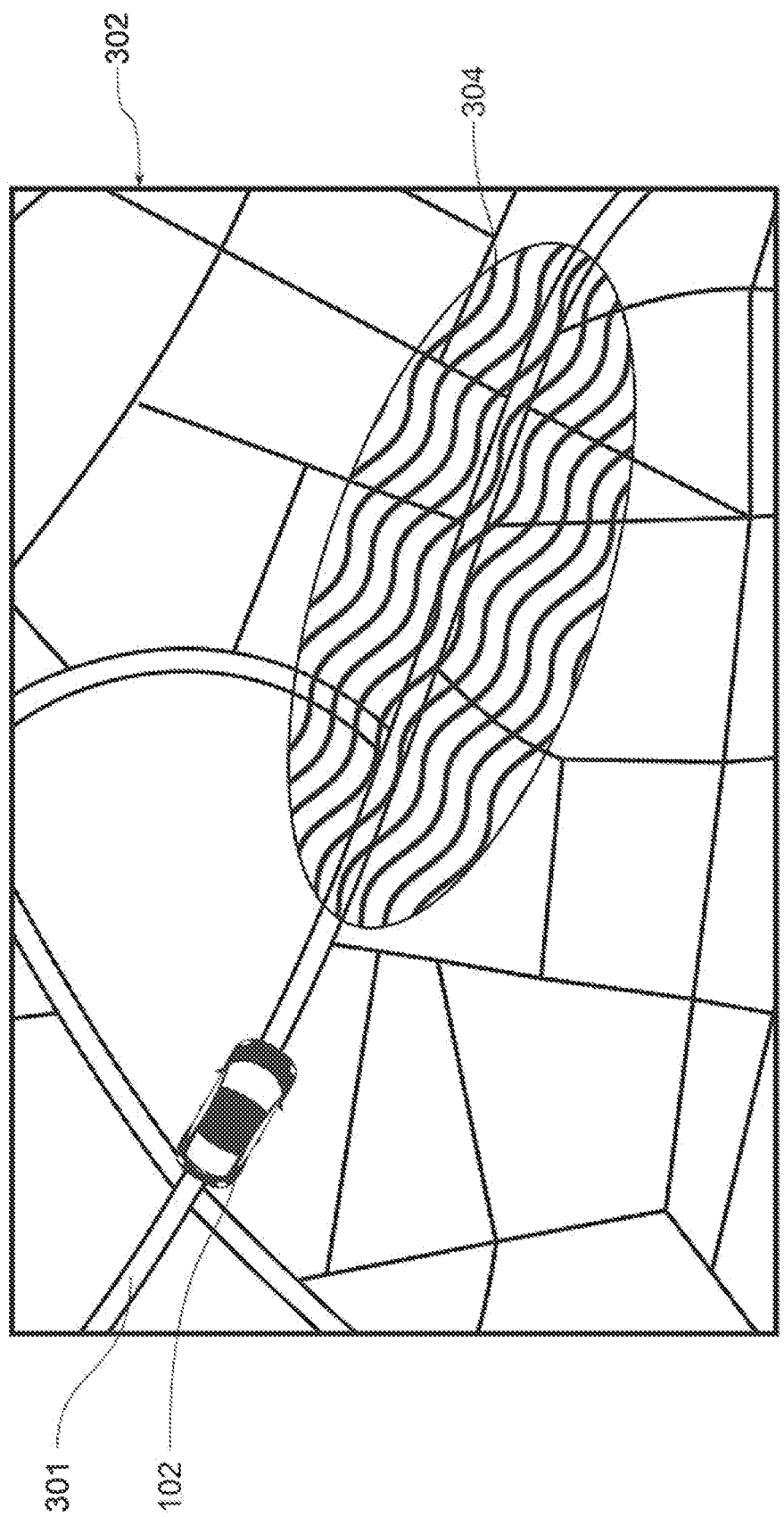

FIG. 3B is a depiction of a first zone of intent 304 overlayed on the map 302. The first zone of intent 304 is a generally elliptical shape that follows the vector of intended travel 208 along the roadway. The first zone of intent 304 is offset a distance ahead of the vehicle VEH along the roadway. The perimeter of the first zone of intent 304 may define a space within which points of interest are selectable by the user of the vehicle VEH without backtracking by the time the selected point of interest is added as a waypoint.

Figure 3C:
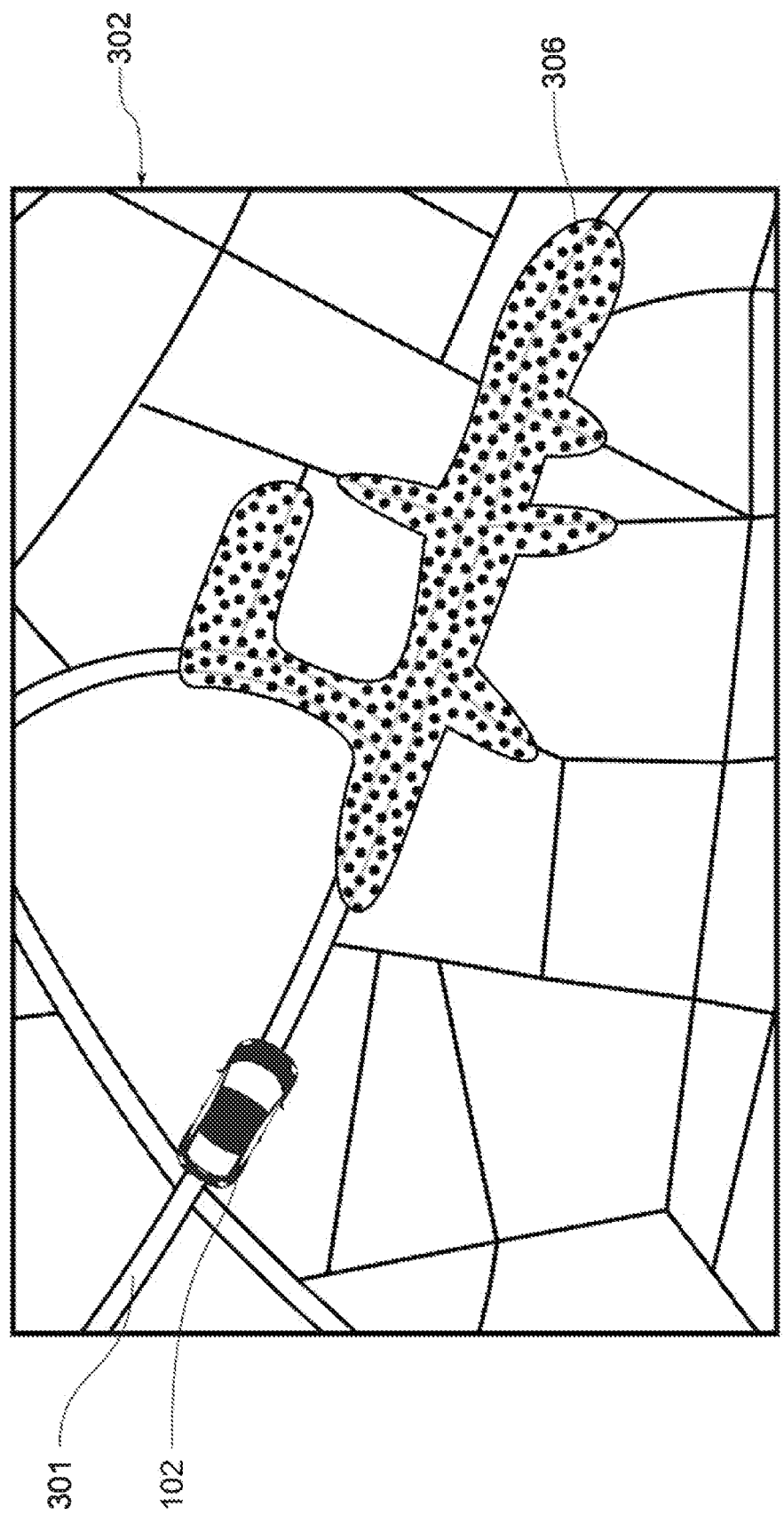

FIG. 3C is a depiction of a second zone of intent 306 overlayed on the map 302. The second zone of intent 306 is an irregular shape that follows the roadway and connected paths that the vehicle may take. The perimeter of the second zone of intent 306 defines, for example, the space of all points that the vehicle 102 may travel to that are less than a predetermined threshold. For example, the second zone of intent 306 may be all locations within five minutes travel of the vehicle 102.

Figure 3D:
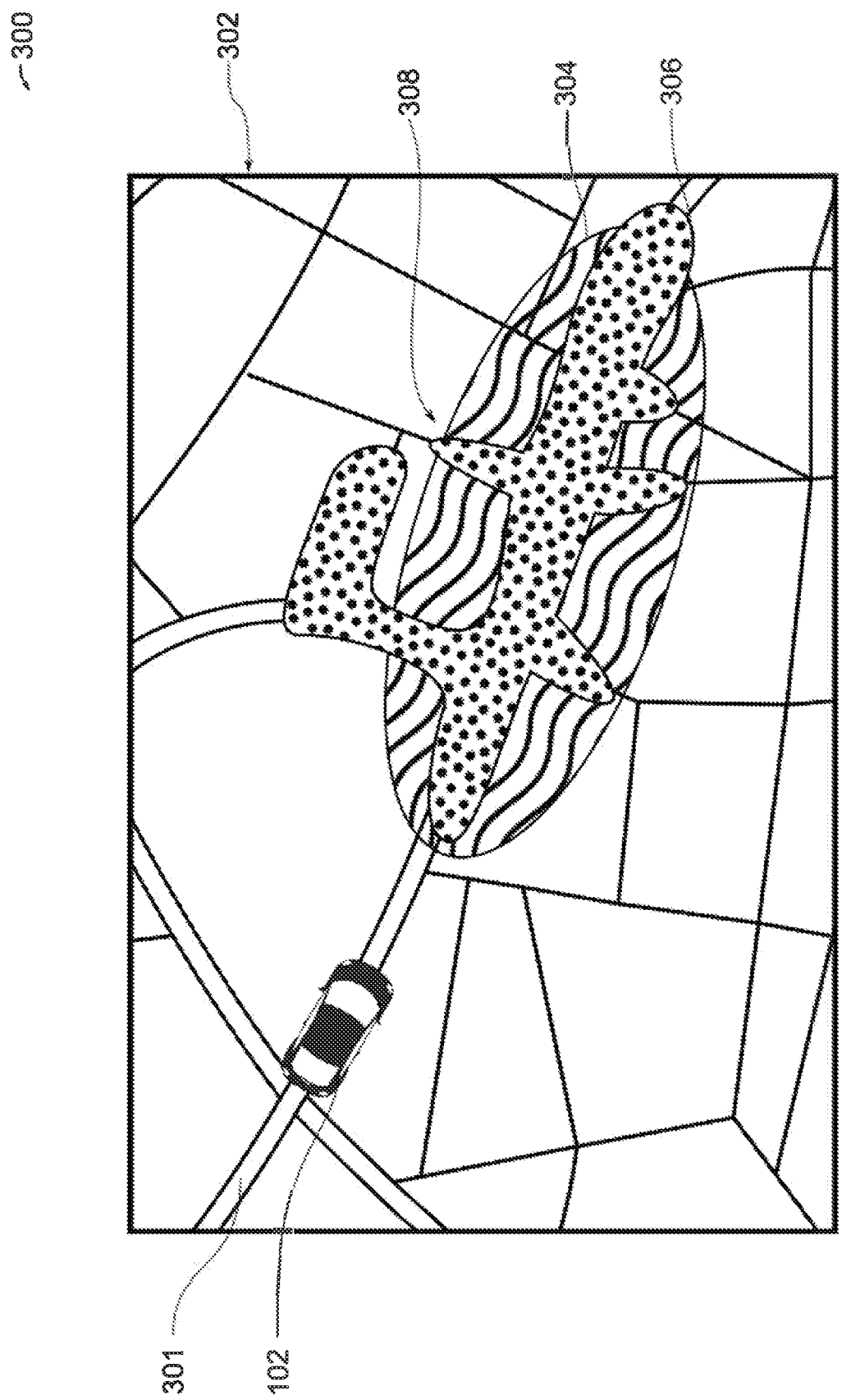

FIG. 3D is a depiction of the vehicle 102 traveling along the roadway with the first zone of intent 304 and the second zone of intent 306 overlayed on the map 302. The depiction includes a point of interest 308 that satisfies the user need and is shared by both the first zone of intent 304 and the second zone of intent 306.

Figure 4:
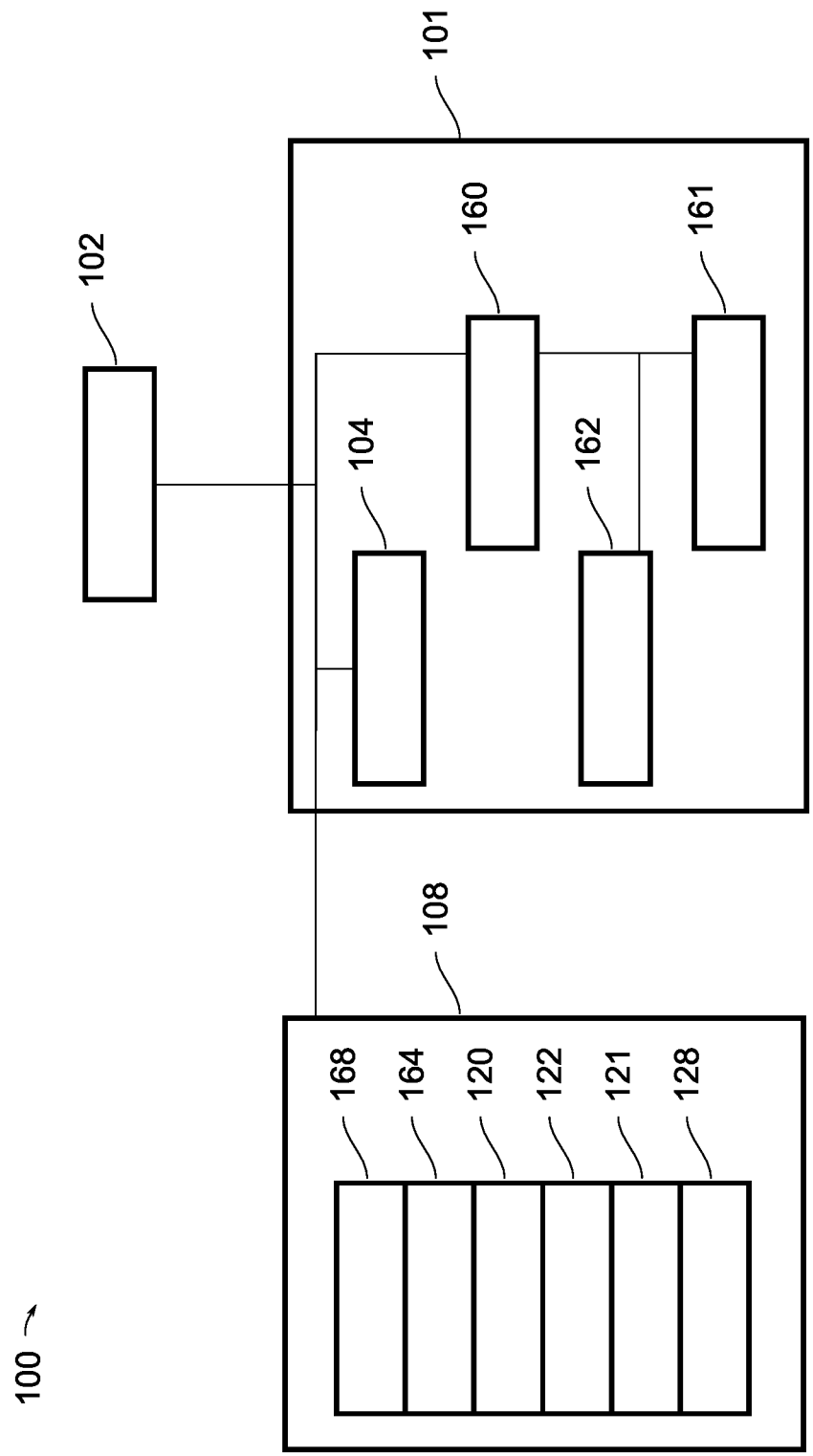
FIG. 4 illustrates a search result filter, according to aspect of the present disclosure.

FIG. 4 illustrates a search result filter 400. The search result filter 400 includes an attribute negotiator 402, a persistence layer 404, and an attributes object 406.

The attribute negotiator 402 is configured to and prioritize search results based on collected attributes and preferences associated with the user need. The attribute negotiator 402 may constrain information for each activity to optimize ranking and choice of relevant points of interest that fulfill an identified user need.

The persistence layer 404 is configured to maintain or store information for at least one system state. The persistence layer 404 includes a points of interest datastore 408, a preferences datastore 410, a preferences filter 412, and one or more preferences libraries 414.

The points of interest datastore 408 is configured to store information related to points of interest that may be used to fulfill needs of the user. The stored information may include, for example, hours of operation, historical use information, efficiency, business, and visitors.

The preferences datastore 410 is configured to store information related to the user and/or occupants of the vehicle 102. The stored information may include, for example, identification data, role data, historical response data, biometric data, credential information, associated devices, associated individuals, relationships, use history, and behavioral information.

The preferences filter 412 is configured to process data received from the preferences libraries 414 and provide the filtered data to the preferences datastore 410. The preferences filter 412 may use a system state to remove or promote certain preferences based on specificity of the preference relative to other preferences (e.g., promote use of a historical user preference over a demographical user preference).

The preferences library 414 is configured to contain information related to preferences. The information may correspond to preferences for an individual, group, location, task, trip type, condition, combinations thereof, and the like. For example, the preferences information may include a preference of a user for restaurants, cuisine, services, environments, activities, etc.

The attributes object 406 is configured to hold instantaneous attributes for constraining and/or ordering the search results that are provided to the user. The attributes object includes an urgency determination 416, a passenger environment determination 418, an exterior environment determination 420, a vehicle status determination 422, a vector determination 424, and search-zone attributes 426 for at least one zone of intent 202.

The urgency determination 416 is configured to provide a metric of the determined urgency for fulfilling the associated need. For example, the system 100 may prioritize temporally proximate fulfillment conditions to temporally distal fulfillment conditions when a need has a higher urgency and may use little to no weight for temporal differences in fulfillment conditions when a need has a lower urgency.

The passenger environment determination 418 is configured to provide a metric of the determined passenger environment related to fulfilling the associated need. For example, the number of passengers within the environment, known/unknown identities of passengers, individual preferences or demographics for each passenger, and the like may be used to increase or decrease weights for points of interest to fulfill the needs based on optimizing satisfaction of all passengers.

The exterior environment determination 420 is configured to provide a metric of the exterior environment related to fulfilling the associated need. For example, inclement weather conditions may be used to reduce the weight of unprotected points of interest relative to sheltered points of interest.

The vehicle status determination 422 is configured to provide a metric of the vehicle and needs associated therewith. For example, vehicle range may be used to filter out points of interest that are beyond the contemporaneous range of the vehicle. In further examples, a low-fuel condition or a changed fuel consumption may be used to increase or decrease the urgency of one or more needs.

The vector determination 424 is configured to provide a metric of the vector of intended travel 208. For example, points of interest that deviate from the vector of intended travel 208 by greater than a predetermined threshold may be filtered from the search results or have an associated weight reduced.

The search-zone attributes 426 for the zones of intent 202 are configured to provide a metric of the shape and/or configuration of the search zone. In some aspects, in response to points of interest in the filtered results exceeding a predetermined value or having rankings that are too similar, the system 100 may update the attributes object 406 and/or assign a greater or lesser weight to certain of the attributes.

Figure 5:
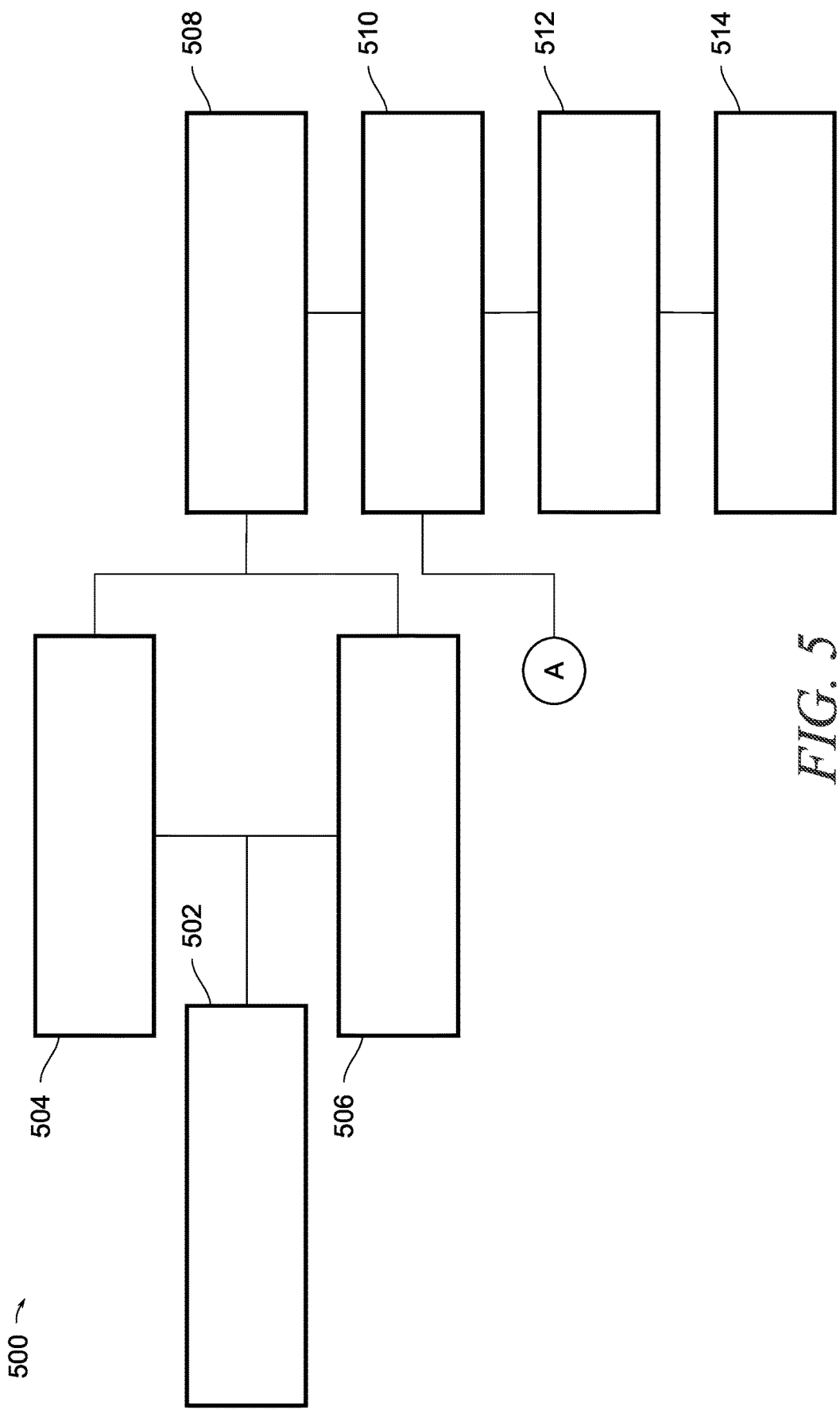
FIG. 5 depicts a schematic scenario for fulfilling a user need of food, according to aspect of the present disclosure.
Figure 6:
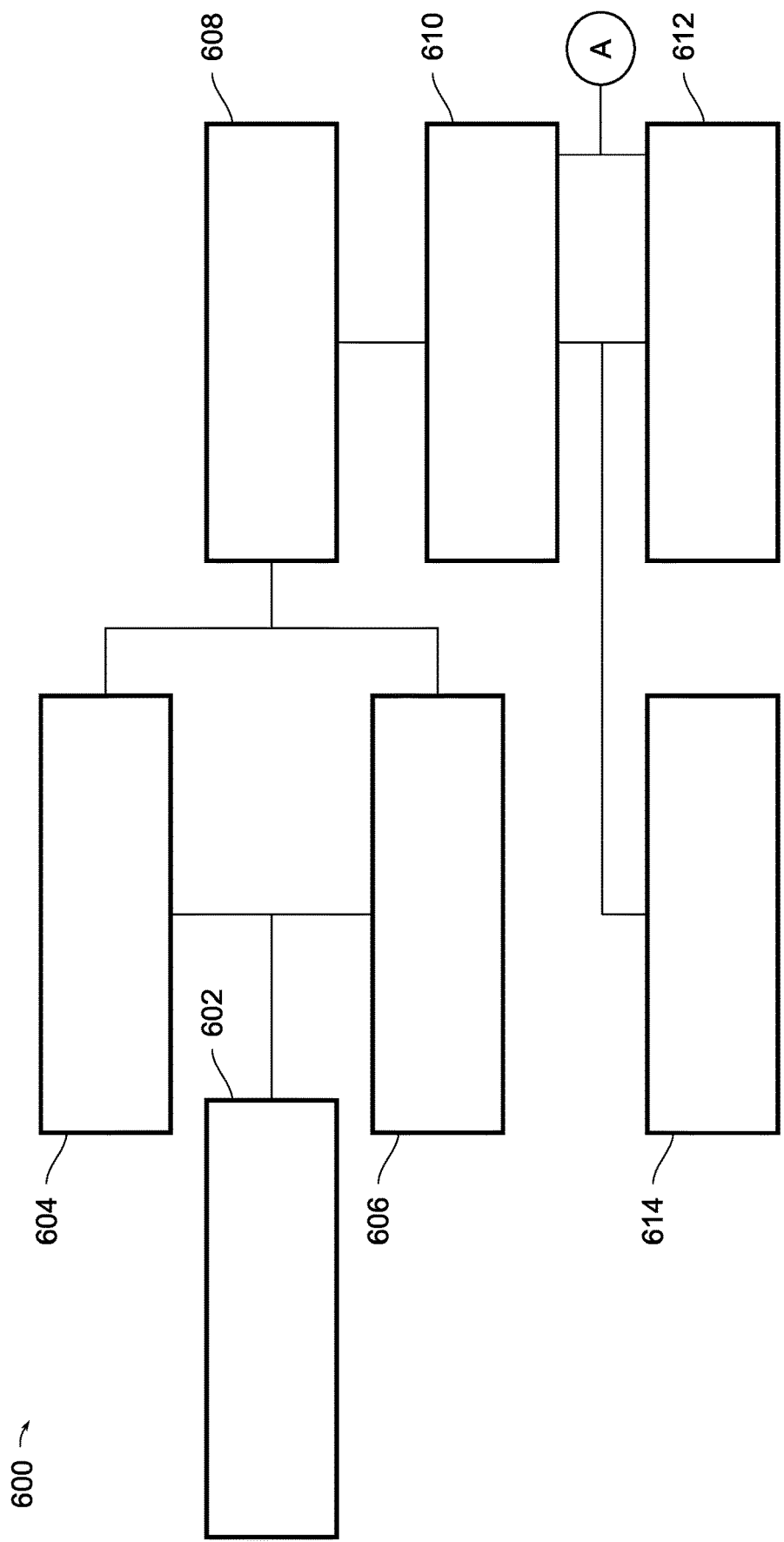
FIG. 6, depicts a schematic scenario that fulfills a need of refueling/recharging, according to aspect of the present disclosure.

FIGS. 5 and 6 illustrate an example trip scenario. The example trip scenario includes a user need of food 500 and a user need of refueling/recharging 600.

FIG. 5 depicts a schematic scenario that fulfills the user need of food 500. At block 502, the user beings the trip. In the illustrated embodiment, the user provides a destination for the trip to the system 100 using an integrated navigational application or a connected navigational application, and the user is provided a route from their location to the destination. While following the route, a determination is made that the user will have a need of food 500 at a future time.

The system 100 may determine that the user will have a need of food 500, via need identifier 106, using an active determination (e.g., at block 504), a passive determination (e.g., at block 506), or a combination thereof. In some examples, the active determination includes the system 100 receiving a user-prompted action indicating the user's desire for food. The user-prompted action may be, for example, a voice action by the user. The user prompt may indicate one or more conditions for fulfilling the need. For example, the user prompt may include a desired time or other constraint for obtaining the food.

In some examples, the system 100 passively determines a potential need using a predictive model. The predictive model may determine a probability of the user having a need of food during the trip. If the probability exceeds a predetermined threshold, the system 100 may then prompt the user for information regarding the need. The requested information may be presented to the user in one or more prompts. For example, the system 100 may ask the user whether they would like to eat before arriving at their destination in a first prompt and, if the user responds affirmatively, provide a second prompt seeking information such as a desired time or desired area to fulfill that need.

At block 508, the system 100 identifies points of interest to optimize user satisfaction when fulfilling the user need using one or more zones of intent 202. In some aspects, the system 100 implements a geotemporal model to reduce overall trip time. For example, the system 100 may determine, from a set of points of interest that fulfill the user need, an amount of time required for food preparation at each of the points of interest. Points of interest that will require lag time between the vehicle 102 arriving at the location and completion of the order may be removed from the set such that the returned search results include only points of interest where food may be pre-ordered, and the order completed contemporaneously with the arrival of the vehicle 102 at the point of interest.

Filtering points of interest may include the system 100 determining an expected time between presentation of the points of interest to the user and completion of the pre-order by the user. Additionally, or alternatively, the system 100 may determine a latest-available pre-order time. The latest-available pre-order time is the latest time that the user may pre-order food to align completion of the order with arrival at the location. The system may inform the user of the latest-available pre-order time and/or hold placement of the order until that time. Beneficially, these actions optimize trip flexibility because, should another need arise in the intervening time between performing the search and the latest-available pre-order time, the trip may be altered to accommodate the intervening need.

At block 510, the system 100 may determine whether there are additional needs to be satisfied. In some examples, the system 100 may determine a refueling need, either existing contemporaneously with determining the food need or arising later, then the system 100 may account for points of interest that fulfill the refueling need when determining points of interest to fulfill the food need. Additionally, or alternatively, the system 100 may consider points of interest for satisfying a food need of other passengers in the vehicle. These additional needs may be accounted for such that the overall trip time is minimized while increasing the trip satisfaction for one or more passengers.

At block 512, the pre-order occurs while en route to the user-selected point of interest, and the vehicle 102 arrives at the user-selected point of interest contemporaneously with completion of the order at block 514.

FIG. 6, depicts a schematic scenario that fulfills the need of refueling/recharging 600. At block 602, the user beings the trip. While this is the same as block 502, it is illustrated separately in FIG. 6 for convenience. While following the route, a determination is made that the user will have a need to refuel 600 at a later point in time.

Similarly to determining the user need of food 500, determining the need to refuel 600 may be an active determination (e.g., at block 604), a passive determination (e.g., at block 606), or a combination thereof. Information that may be collected or accounted for in filtering the points of interest may include available fuel types, price, expected time between arrival at the location and fulfillment of the need to refuel 600, combinations thereof, and the like.

At block 608, the system 100 identifies points of interest using one or more zone of intent 202 to optimize user satisfaction when fulfilling the need to refuel 600 similar to that discussed above in relation to block 508. For example, the system 100 may determine an amount of time required between the vehicle 102 arriving at the location and fulfilling the refueling need of each point of interest in a set of points of interest that fulfill the refueling need. The system then receives a user-selection of a desired point of interest to fulfill the refueling need at block 610.

At block 612, the system 100 may determine whether there are additional needs to be satisfied. Information regarding the refueling need and the additional needs may be determined, and the user may be prompted to add or update one or more waypoints on the trip. For example, the system 100 may determine that an existing food need of a user may be satisfied at a point of interest that is more proximate to the user-selected point of interest for the refueling need than a previously selected waypoint for fulfilling the food need. In response to determining that the waypoint may be changed without cost, the system 100 may prompt the user to replace the previously selected waypoint for fulfilling the food need with the point of interest that is more proximate to the point of interest for fulfilling the refueling need.

At block 614, the vehicle 102 arrives at the user-selected point of interest where the user may proceed to refuel the vehicle 102 and attend to any other identified needs that may be fulfilled at the location.

Figure 7A:
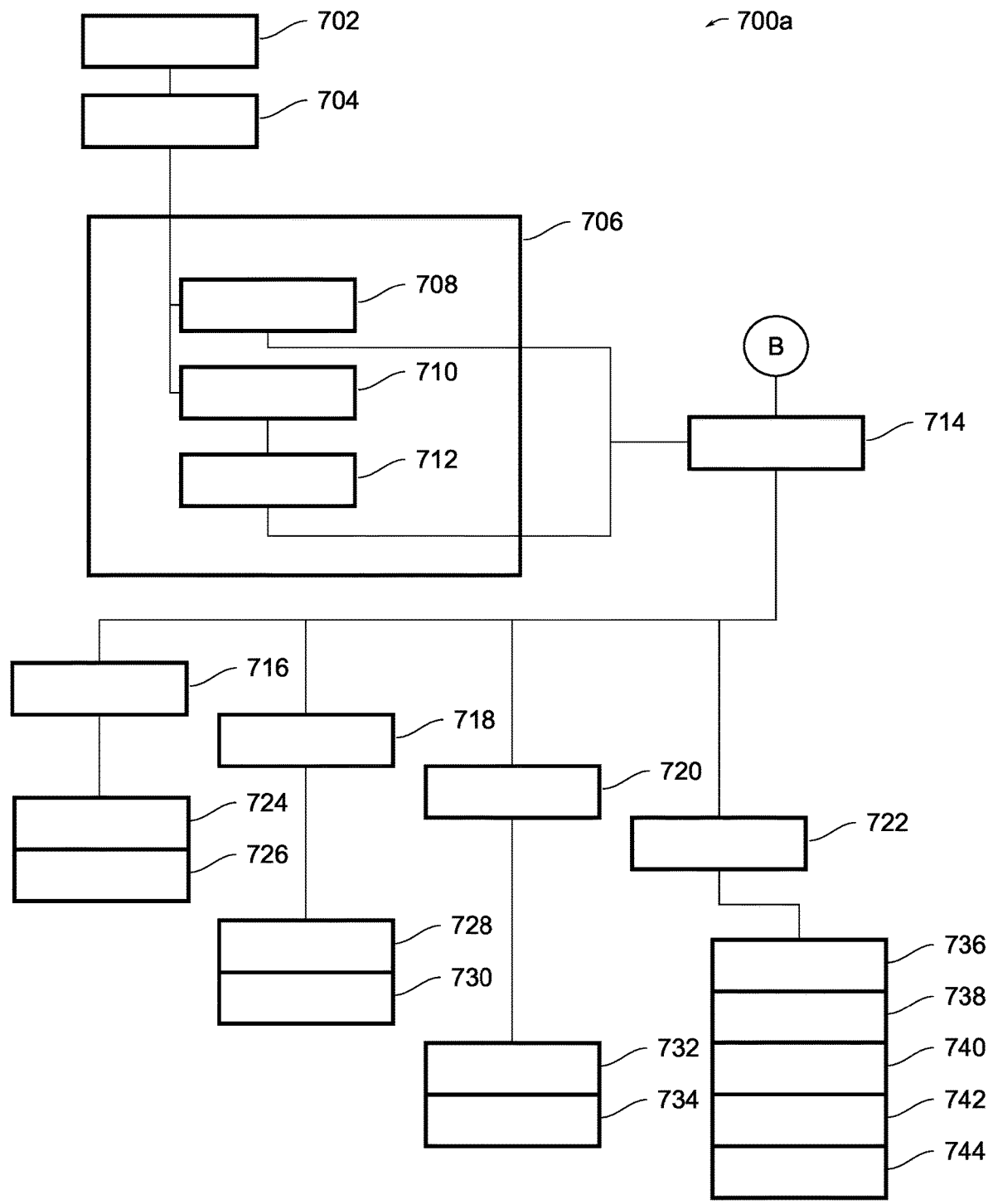
FIGS. 7A, B illustrate an example search implementation, according to aspect of the present disclosure.
Figure 7B:
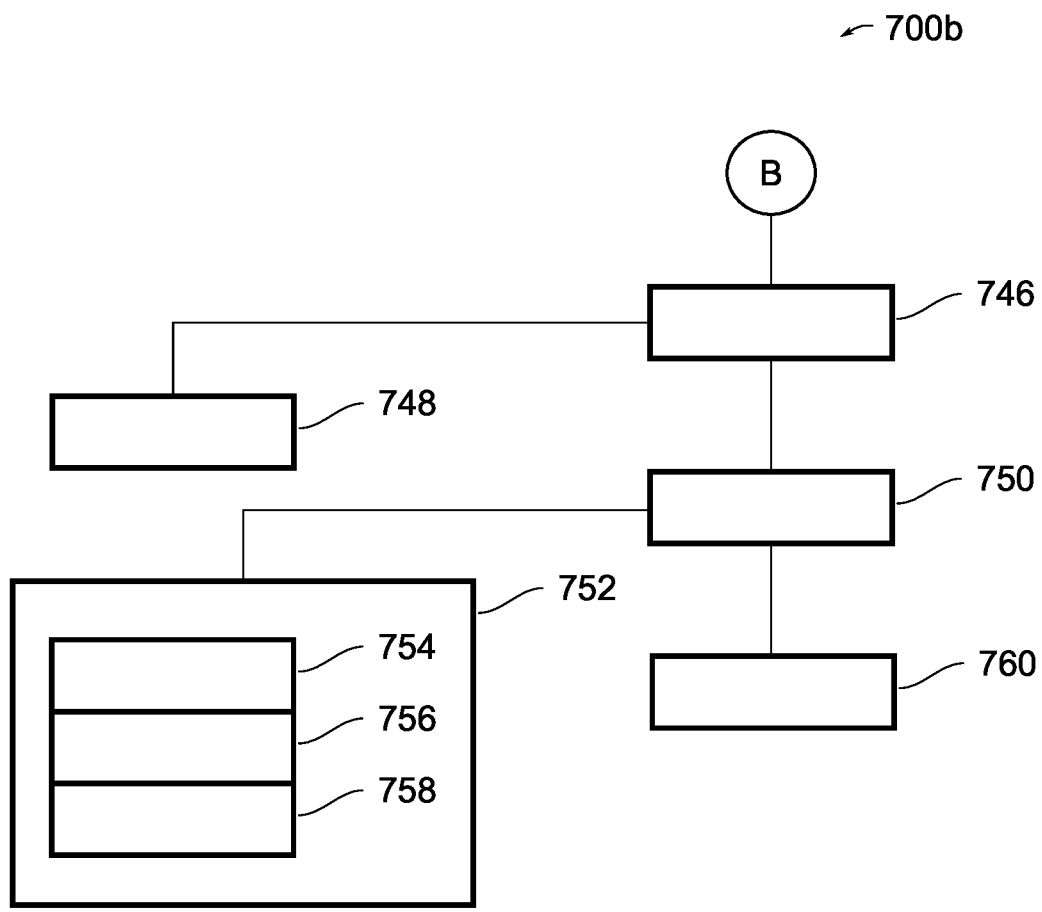

FIGS. 7A, B illustrate a first portion 700a and a second portion 700b of an example search implementation. At block 702, a user need or desire arises during the trip. The system identifies the user at block 704 and obtains the user need at block 706.

The system may actively obtain the user need (e.g., at block 708) and/or passively obtain the user need (e.g., block 710) as discussed above with respect to FIG. 5. If the system 100 passively obtains the user need, the system 100 may prompt the user to confirm the need at block 712.

At block 714, the system 100 collects attributes related to the obtained user need. The attributes for fulfilling the user need may include, for example, individual preferences 716, urgency 718, environment 720, and vehicle status 722. The individual preferences 716 may include, for example, stored preferences related to past fulfillment locations 724 and lag time 726 between arrival at the location and fulfillment of the need.

The urgency 718 may include, for example, user-desire 728 for fulfillment of the need and impact 730 on the user of delayed fulfillment. The urgency 718 may be determined using one or more of voice analysis, word analysis, or need category. The system may use a hierarchy of need types to prioritize fulfillment and/or alter zones of intent 202. For example, the hierarchy of need types may include casual needs, desirable needs, essential needs, urgent needs, and emergency needs.

Casual needs are those needs where a user's satisfaction with the trip is generally indifferent to fulfillment or non-fulfillment of the need. Desirable needs are those needs where fulfillment before destination increases a user's trip satisfaction, but fulfillment at destination possible without significant detriment. Essential needs are those needs where fulfillment prior to reaching the destination is mandatory for a user to be satisfied with the trip. Urgent needs are those needs where fulfillment more proximate in time is desirable and/or delay increases user discomfort. Emergency needs are those needs that are unexpected, and fulfilling the emergency need is of primary concern. In some aspects, fulfilling an emergency need may override other fulfillment of other needs, which may extend to the point of abandoning the present trip in favor of fulfilling the emergency need.

The environment 720 may include, for example, traffic conditions 732 and weather conditions 734. For example, heavy traffic may weigh heavily into determining a zone of intent 202 where user preferences indicate that the user would spend a longer time and/or distance on a detour to avoid being stuck in traffic. In further examples, a user may want to avoid certain roadways or road categories in inclement weather while preferring those same roadways or road categories in nice weather.

The vehicle status 722 may include, for example, proximity to destination 736, elapsed/remaining trip time 738, time since last stop 740, vehicle operating conditions 742 (e.g., fuel level, fuel consumption, fuel range, fluid levels, etc.), and vehicle vector of intent 744. For example, a user may prefer to reduce fuel consumption over reducing travel time, take more-frequent breaks as elapsed trip time increases, avoid certain roadways based on maintenance history or vehicle age, etc.

At block 746, the system 100 negotiates the attributes using, for example, attribute negotiator 748. At block 750, the system 100 performs a search for points of interest that fulfill the need using the negotiated attributes. The search may apply the negotiated attributes to one or more objects 752. These objects may include, for example, a raw search area 754, filtered search items 756, and an actual search zone 758. The system returns the search results to the user at block 760.

Figure 8:
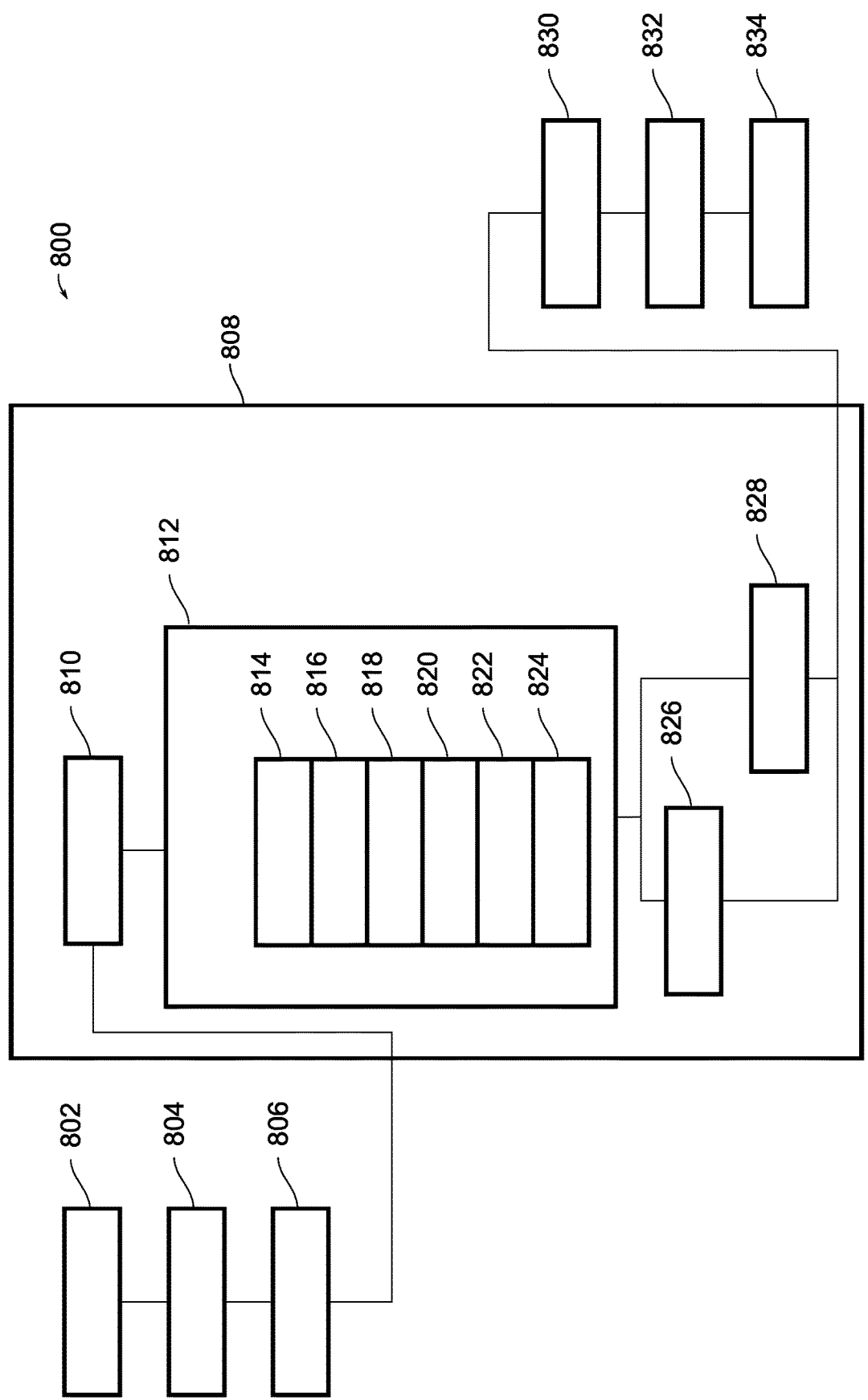
FIG. 8 illustrates a schematic diagram for a search performed by the system of FIG. 1 in response to an actively determined user need, according to aspect of the present disclosure.

FIG. 8 is a schematic diagram for a search 800 performed by the system 100 in response to an actively determined user need. At block 802, the system 100 identifies the user. The system then parses the request to identify the user need at block 804 and initiates the search at block 806.

The system sends a request to perform the search from the vehicle 102 to a remote server 808. The remote server 808 retrieves stored preferences 810 and passes them for parsing and processing of search attributes at block 812. The search attributes used by the system 100 may include, for example, urgency attributes 814, passenger environment attributes 816, exterior environment attributes 818, vehicle status attributes 820, vector attributes 822, and search zone attributes 824.

The search attributes are provided to the attribute negotiator 826. The attribute negotiator 826 returns constrained information to each activity to optimize ranking and choice of relevant points of interest for fulfilling the identified need.

At block 828, the search is finalized to obtain the search results. The obtained search results may be filtered and/or ordered according to identified zones of intent 202. The search results are returned to the vehicle 102 at block 830.

The system 100 may apply an additional discriminator to the search results and present the results to the user at block 832, and the system 100 may monitor the user for a response to the presented results and update the user preferences accordingly at block 834.

Figure 9:
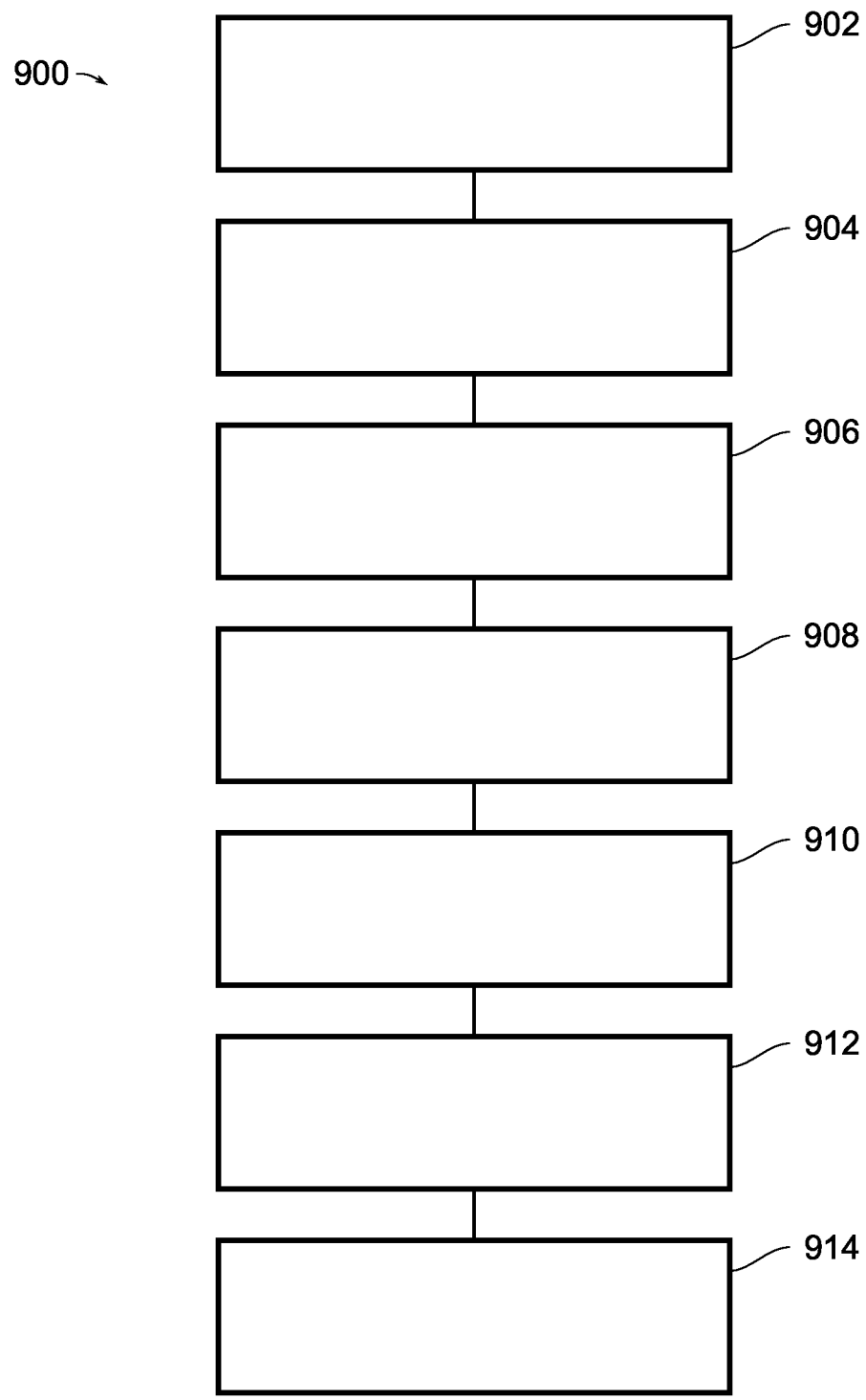
FIG. 9 illustrates a schematic diagram for a method of optimizing need fulfillment during a trip, according to aspect of the present disclosure.

FIG. 9 illustrates a flowchart for a method 900 of optimizing need fulfillment during a trip. The method 900 passively identifies a need of a user of a vehicle that arises during a trip by obtaining a state of the trip at block 902, determining a probability of occurrence of the need of the user based on the obtained state of the trip at block 904, and prompting the user, in response to the probability exceeding a predetermined threshold, to confirm at least one detail of the need at block 906.

After the user confirms details of the need, the method 900 negotiates a plurality of attributes related to satisfying the need at block 908. At block 910, at least one geotemporal zone of intent for satisfying the need is determined based on a vector of intended travel of the vehicle and the negotiated plurality of attributes. A point of interest for fulfilling the need within one or more of the at least one geotemporal zone of intent is determined at block 912. The point of interest is returned to the user at block 914 for the user to add the point of interest to the trip as a waypoint.

While the system 100 illustrates certain components as part of the vehicle 102, it is contemplated that one or more of the illustrated components may be implemented remotely to the vehicle 102.

The terms "controller," "control module," "control," "control unit," "processor" and similar terms mean Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, other components, combinations thereof, and the like to provide the described functionality. "Software," "firmware," "programs," "instructions," "routines," "code," "algorithms" and similar terms mean controller executable instruction sets including calibrations and look-up tables.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle system comprising:
    a need identifier configured to identify a need of a user of a vehicle arising during a trip;
    a search attribute negotiator configured to negotiate a plurality of attributes related to satisfying the need based on a state of the trip;
    a point of interest identifier configured to:
        determine at least one geotemporal zone of intent for satisfying the need based on a vector of intended travel of the vehicle and the negotiated plurality of attributes;
        detect a point of interest for fulfilling the need within one or more of the at least one geotemporal zone of intent; and
        return the point of interest to the user for addition to the trip as a waypoint to fulfill the need based on optimizing user satisfaction with the trip over other points of interest for fulfilling the need;
    a navigational display configured to direct the user along a navigational route to the waypoint; and
    a controller comprising a memory having a recordable medium to provide computer-readable data and a processor arranged to execute controller-executable instructions stored in the memory, the controller configured to control the need identifier, the search attribute negotiator, a point of interest identifier, and the navigational display via transmission media for transmitting the controller-executable instructions thereto,
    wherein the need is a first need, the point of interest is a first point of interest, and the point of interest identifier is further configured to:
    identify a second need arising during the trip;
    negotiate a second plurality of attributes related to satisfying the first need and the second need;
    determine at least one second geotemporal zone of intent for satisfying the first need and the second need based on the vector of intended travel of the vehicle and the negotiated second plurality of attributes;
    detect a second point of interest for fulfilling the second need within one or more of the at least one second geotemporal zone of intent; and
    return the second point of interest to the user for addition to the trip as a second waypoint to fulfill the second need based on optimizing user satisfaction with the trip.

2. The system of claim 1, wherein the need identifier is configured to passively identify the need by:
    obtaining the state of the trip;
    determining a probability of occurrence of the need of the user based on the obtained state of the trip; and
    prompting the user, in response to the probability exceeding a predetermined threshold, to confirm at least one detail of the need.

3. The system of claim 1, wherein the plurality of attributes includes an urgency for satisfying the need based on a type of the need.

4. The system of claim 3, wherein the urgency for satisfying the need is further based on an unprompted user input.

5. The system of claim 1, wherein the need is a first need, the point of interest is a first point of interest, and the point of interest identifier is further configured to:
    identify a second need arising during the trip;
    negotiate a second plurality of attributes related to satisfying the first need and the second need;
    determine at least one second geotemporal zone of intent for satisfying the first need and the second need based on the vector of intended travel of the vehicle and the negotiated second plurality of attributes;
    detect a second point of interest for fulfilling the second need within one or more of the at least one second geotemporal zone of intent; and
    return the second point of interest to the user for addition to the trip as a second waypoint to fulfill the second need based on optimizing user satisfaction with the trip.

6. The system of claim 5, wherein the waypoint is a first waypoint, the second need is identified during navigation to the first waypoint, and the point of interest identifier is further configured to:
    detect a third point of interest for fulfilling the first need within the one or more of the at least one second geotemporal zone of intent;
    determine, based on fulfilling the second need at the second point of interest, that the third point of interest provides greater user satisfaction based on the second plurality of attributes than the first point of interest provides; and
    return the third point of interest to the user as a third waypoint to replace the first waypoint.

7. The system of claim 6, wherein the other points of interest for fulfilling the first need includes the third point of interest.

8. The system of claim 5, wherein the second need is a need of a second user.

9. A method comprising:
    identifying a need of a user of a vehicle arising during a trip;
    negotiating a plurality of attributes related to satisfying the need;
    determining at least one geotemporal zone of intent for satisfying the need based on a vector of intended travel of the vehicle and the negotiated plurality of attributes;
    detecting a point of interest for fulfilling the need within one or more of the at least one geotemporal zone of intent; and
    returning the point of interest to the user for addition to the trip as a waypoint to fulfill the need based on optimizing user satisfaction with the trip over other points of interest for fulfilling the need,
    wherein the need is a first need, the point of interest is a first point of interest, and the point of interest identifier is further configured to:
    identify a second need arising during the trip;
    negotiate a second plurality of attributes related to satisfying the first need and the second need;
    determine at least one second geotemporal zone of intent for satisfying the first need and the second need based on the vector of intended travel of the vehicle and the negotiated second plurality of attributes;
detect a second point of interest for fulfilling the second need within one or more of the at least one second geotemporal zone of intent; and
return the second point of interest to the user for addition to the trip as a second waypoint to fulfill the second need based on optimizing user satisfaction with the trip.

10. The method of claim 9, wherein the need is passively identified, via a need identifier, by:
    obtaining a state of the trip;
    determining a probability of occurrence of the need of the user based on the obtained state of the trip; and
    prompting the user, in response to the probability exceeding a predetermined threshold, to confirm at least one detail of the need.

11. The method of claim 9, wherein the plurality of attributes includes an urgency for satisfying the need based on a type of the need.

12. The method of claim 11, wherein the urgency for satisfying the need is further based on an unprompted user input.

13. The method of claim 9, wherein the need is a first need, the point of interest is a first point of interest, and the method further comprises:
    identifying a second need arising during the trip;
    negotiating a second plurality of attributes related to satisfying the first need and the second need;
    determining at least one second geotemporal zone of intent for satisfying the first need and the second need based on the vector of intended travel of the vehicle and the negotiated second plurality of attributes;
    detecting a second point of interest for fulfilling the second need within one or more of the at least one second geotemporal zone of intent; and
    returning the second point of interest to the user for addition to the trip as a second waypoint to fulfill the second need based on optimizing user satisfaction with the trip.

14. The method of claim 13, wherein the waypoint is a first waypoint, identifying the second need occurs during navigation to the first waypoint, and the method further comprises:
    detecting a third point of interest for fulfilling the first need within the one or more of the at least one second geotemporal zone of intent;
    determining, based on fulfilling the second need at the second point of interest, that the third point of interest provides greater user satisfaction based on the second plurality of attributes than the first point of interest provides; and
    returning the third point of interest to the user as a third waypoint to replace the first waypoint.

15. The method of claim 14, wherein the other points of interest for fulfilling the first need includes the third point of interest.

16. The method of claim 13, wherein the second need is a need of a second user.

17. A vehicle comprising:
    a need identifier configured to identify a need of a user of the vehicle arising during a trip;
    a search attribute negotiator configured to negotiate a plurality of attributes related to satisfying the need based on a state of the trip;
    a point of interest identifier configured to:
        determine at least one geotemporal zone of intent for satisfying the need based on a vector of intended travel of the vehicle and the negotiated plurality of attributes;
        detect a point of interest for fulfilling the need within one or more of the at least one geotemporal zone of intent; and
        return the point of interest to the user for addition to the trip as a waypoint to fulfill the need based on optimizing user satisfaction with the trip over other points of interest for fulfilling the need;
    a navigational display configured to direct the user along a navigational route to the waypoint; and
    a controller comprising a memory having a recordable medium to provide computer-readable data and a processor arranged to execute controller-executable instructions stored in the memory, the controller configured to control the need identifier, the search attribute negotiator, a point of interest identifier, and the navigational display via transmission media for transmitting the controller-executable instructions thereto,
    wherein the need is a first need, the point of interest is a first point of interest, and the point of interest identifier is further configured to:
    identify a second need arising during the trip;
    negotiate a second plurality of attributes related to satisfying the first need and the second need;
    determine at least one second geotemporal zone of intent for satisfying the first need and the second need based on the vector of intended travel of the vehicle and the negotiated second plurality of attributes;
    detect a second point of interest for fulfilling the second need within one or more of the at least one second geotemporal zone of intent; and
    return the second point of interest to the user for addition to the trip as a second waypoint to fulfill the second need based on optimizing user satisfaction with the trip.

18. The vehicle of claim 17, wherein the need is a first need, the point of interest is a first point of interest, and the point of interest identifier is further configured to:
    identify a second need arising during the trip;
    negotiate a second plurality of attributes related to satisfying the first need and the second need;
    determine at least one second geotemporal zone of intent for satisfying the first need and the second need based on the vector of intended travel of the vehicle and the negotiated second plurality of attributes;
    detect a second point of interest for fulfilling the second need within one or more of the at least one second geotemporal zone of intent; and
    return the second point of interest to the user for addition to the trip as a second waypoint to fulfill the second need based on optimizing user satisfaction with the trip.

19. The vehicle of claim 18, wherein the waypoint is a first waypoint, the second need is identified during navigation to the first waypoint, and the point of interest identifier is further configured to:
    detect a third point of interest for fulfilling the first need within the one or more of the at least one second geotemporal zone of intent;
    determine, based on fulfilling the second need at the second point of interest, that the third point of interest provides greater user satisfaction based on the second plurality of attributes than the first point of interest provides; and
    return the third point of interest to the user as a third waypoint to replace the first waypoint.

20. The vehicle of claim 19, wherein the other points of interest for fulfilling the first need includes the third point of interest.

* * * * *